(12) United States Patent
Makovicka (10) Patent No.: US 8,774,343 B2
(45) Date of Patent: Jul. 8, 2014

(54) FLOW TRIPPING DEVICE

(75) Inventor: Mason D. Makovicka, Wilmington, NC (US)

(73) Assignee: Global Nuclear Fuel—Americas, LLC, Wilmington, NC (US)

( * ) Notice: Subject to any disclaimer, the term of this patent is extended or adjusted under 35 U.S.C. 154(b) by 982 days.

(21) Appl. No.: 12/968,874

(22) Filed: Dec. 15, 2010

(65) Prior Publication Data
US 2012/0155601 A1 Jun. 21, 2012

(51) Int. Cl.
*G21C 15/00* (2006.01)
*G21C 3/324* (2006.01)

(52) U.S. Cl.
CPC .............. *G21C 33/322* (2013.01); *Y02E 30/38* (2013.01); *Y02E 30/31* (2013.01); *G21C 3/324* (2013.01)
USPC .......................................... 376/399; 376/439

(58) Field of Classification Search
USPC ................................... 376/399, 439
See application file for complete search history.

(56) References Cited

U.S. PATENT DOCUMENTS 4,698,204 A * 10/1987 Taleyarkhan ................. 376/439
8,599,994 B2 12/2013 Higgins 2002/0136348 A1 * 9/2002 Hirano et al. ................. 376/438
2005/0105676 A1 * 5/2005 Liebler-Ranzus ............ 376/434
2008/0267340 A1 * 10/2008 Higgins ........................ 376/438

FOREIGN PATENT DOCUMENTS

JP 03-030894 3/1991
JP 2008-275615 A 11/2008

OTHER PUBLICATIONS

Japanese Office Action issued in corresponding Japanese Application No. 2011-271835, dated Jan. 21, 2014.

* cited by examiner

*Primary Examiner* — Timothy A Brainard
(74) *Attorney, Agent, or Firm* — Harness, Dickey & Pierce, P.L.C.

(57) ABSTRACT

A flow tripping device according to a non-limiting embodiment of the present invention may include a peripheral band surrounding a central space. A plurality of flow tabs may extend from an upper portion of the peripheral band toward the central space. A plurality of finger structures may extend from a lower portion of the peripheral band. When installed in a fuel channel of a boiling water reactor (BWR), the critical power ratio (CPR) performance of the periphery rods may be increased, thereby also increasing overall performance. Consequently, the increased power translates to lower fuel cycle costs.

20 Claims, 7 Drawing Sheets

FLOW TRIPPING DEVICE

BACKGROUND

1. Field

The present disclosure relates to devices for harvesting water from the channel walls of a boiling water reactor (BWR).

2. Description of Related Art

Developments in fuel bundle designs have improved the critical power ratio (CPR) performance of interior rods. As a consequence, the periphery rods have become limiting in design. To improve the critical power ratio (CPR) performance of periphery rods, features have been machined in the channel walls to act as flow trippers. However, such machined features may be difficult to produce, inspect, and require specialized equipment. As a result, machining flow tripping features in the channel walls can be costly.

SUMMARY

A flow tripping device according to a non-limiting embodiment of the present invention may include a peripheral band surrounding a central space; a plurality of flow tabs extending from an upper portion of the peripheral band toward the central space; and a plurality of finger structures extending from a lower portion of the peripheral band.

The peripheral band may have a symmetrical shape based on a plan view. The peripheral band may include a plurality of corners based on a plan view, and each corner of the peripheral band may be provided with at least one of the plurality of flow tabs. Similarly, the peripheral band may include a plurality of corners based on a plan view, and each corner of the peripheral band may be provided with at least one of the plurality of finger structures.

Each of the plurality of flow tabs may taper as it extends from the peripheral band. Each of the plurality of flow tabs may also curve inward toward the central space. The plurality of flow tabs may be spaced apart from each other by a space that corresponds to a shape of an inverted flow tab.

Each of the plurality of finger structures may have a segment that is parallel to but on a different plane than an outer wall of the peripheral band. Each of the plurality of finger structures may extend upward and back toward the peripheral band. Alternatively, each of the plurality of finger structures may extend downward and away from the peripheral band. The plurality of finger structures may be separated from each other by a plurality of slits. A total quantity of the plurality of finger structures may exceed a total quantity of the plurality of flow tabs. For instance, a ratio of the total quantity of the plurality of finger structures to the total quantity of the plurality of flow tabs may be about 3:1.

The flow tripping device may additionally include a plurality of dividers in the central space bounded by the peripheral band. The plurality of dividers may be connected to opposing inner walls of the peripheral band. A ratio of a total quantity of the plurality of dividers to a total quantity of the plurality of flow tabs may be about 1:6. The plurality of dividers may include a first group of parallel dividers that intersect a second group of parallel dividers. The first group of parallel dividers may be orthogonal to the second group of parallel dividers.

The flow tripping device may further include a plurality of convex portions on the peripheral band. The plurality of convex portions may protrude away from the central space bounded by the peripheral band.

A fuel bundle according to a non-limiting embodiment of the present invention may include a fuel channel; a plurality of fuel rods within the fuel channel; at least one water rod arranged in parallel with the plurality of fuel rods; and a flow tripping device secured to the at least one water rod, the flow tripping device including a peripheral band surrounding the plurality of fuel rods, a plurality of flow tabs extending from an upper portion of the peripheral band toward the plurality of fuel rods, and a plurality of finger structures extending from a lower portion of the peripheral band and configured to apply a spring force to inner walls of the fuel channel.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and inter mediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 1A:
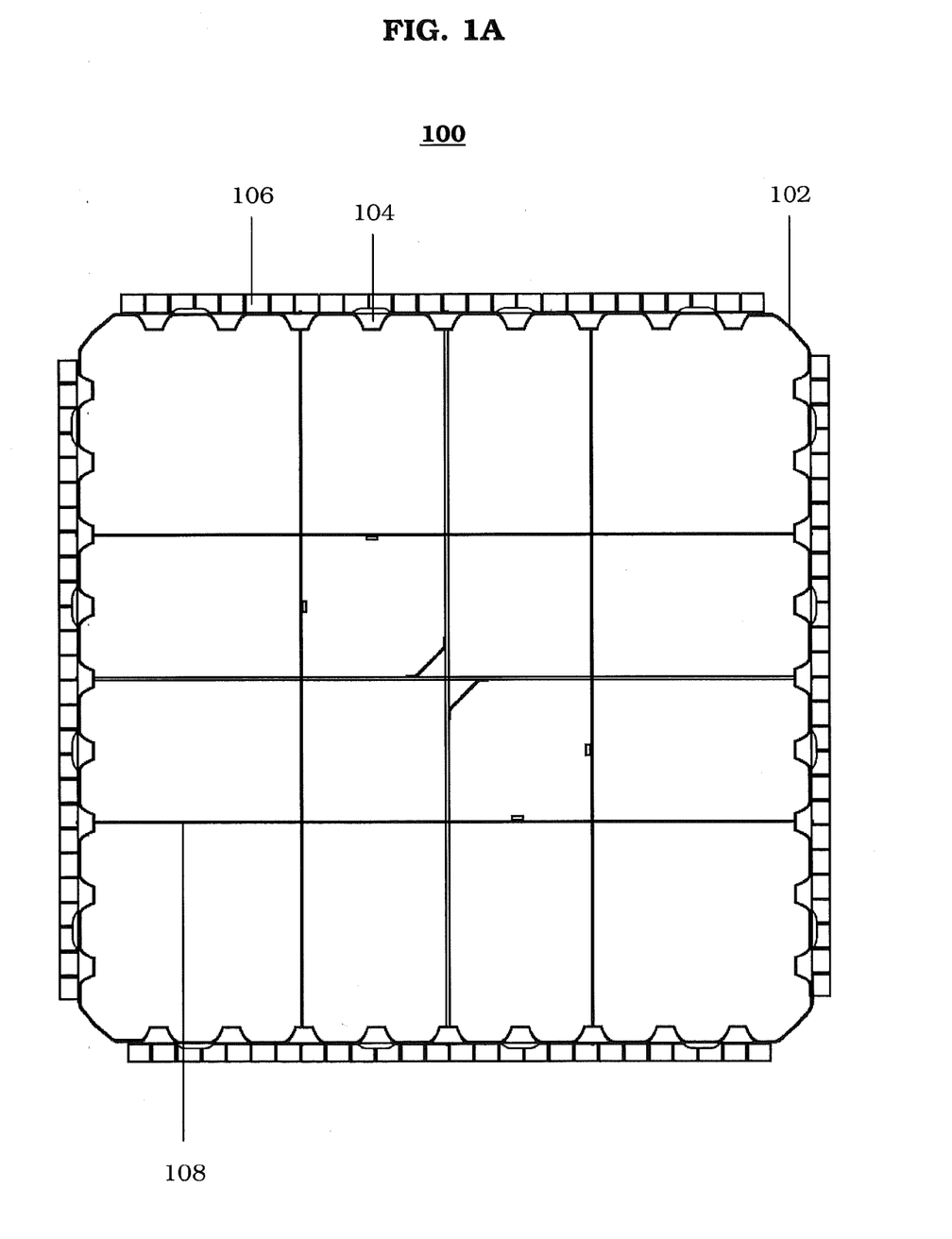
FIG. 1A is a plan view of a flow tripping device according to a non-limiting embodiment of the present invention.

FIG. 1A is a plan view of a flow tripping device according to a non-limiting embodiment of the present invention. Referring to FIG. 1A, the flow tripping device 100 includes a peripheral band 102 surrounding a central space. The peripheral band 102 may have a symmetrical shape based on a plan view. As shown in the drawings, the peripheral band 102 may be square-shaped. However, it should be understood that the peripheral band 102 may have other dimensions depending on the shape of the channel that is intended to accommodate it.

A plurality of flow tabs 104 and finger structures 106 extend from the peripheral band 102. A total quantity of the plurality of finger structures 106 exceeds a total quantity of the plurality of flow tabs 104. As shown in the drawings, the flow tripping device 100 may be provided with nine flow tabs 104 and twenty-six finger structures 106' on each side of the peripheral band 102 (for a total of thirty-six flow tabs 104 and one hundred and four finger structures 106). Thus, a ratio of the total quantity of the plurality of finger structures 106 to the total quantity of the plurality of flow tabs 104 may be about 3:1, although example embodiments are not limited thereto. Although not shown, each corner of the peripheral band 102 may be provided with at least one of the plurality of flow tabs 104. Similarly, although not shown, each corner of the peripheral band 102 may be provided with at least one of the plurality of finger structures 106.

The flow tripping device 100 also includes a plurality of dividers 108 in the central space bounded by the peripheral band 102. The plurality of dividers 108 are connected to opposing inner walls of the peripheral band 102. The plurality of dividers 108 includes a first group of parallel dividers intersecting a second group of parallel dividers. The first group of parallel dividers may be orthogonal to the second group of parallel dividers. As illustrated in the drawings, the first group may include three dividers 108, and the second group may also include three dividers 108 (for a total of six dividers 108). Thus, a ratio of a total quantity of the plurality of dividers 108 to a total quantity of the plurality of flow tabs 104 may be about 1:6, although example embodiments are not limited thereto.

Figure 1B:
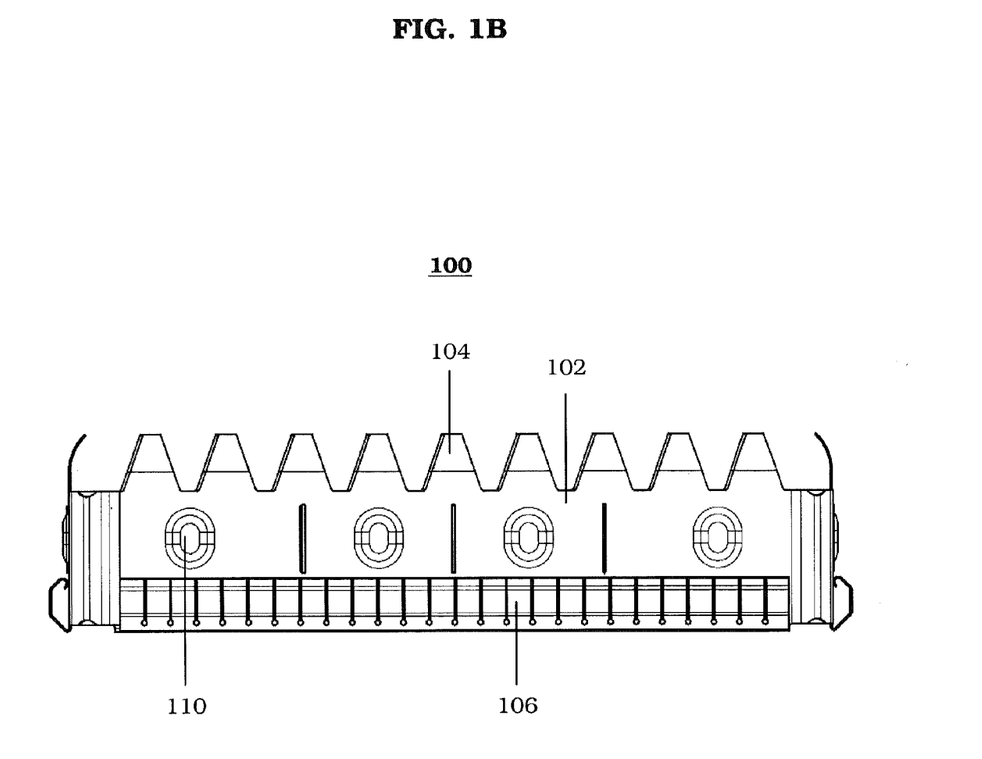
FIG. 1B is a side view of a flow tripping device according to a non-limiting embodiment of the present invention.

FIG. 1B is a side view of a flow tripping device according to a non-limiting embodiment of the present invention. Referring to FIG. 1B, the plurality of flow tabs 104 extend from an upper portion of the peripheral band 102 toward the central space. The plurality of flow tabs 104 taper as they extend from the peripheral band 102. Although the plurality of flow tabs 104 are illustrated as being flat-tipped, it should be understood that the tips may be more (or less) pointed. The plurality of flow tabs 104 also curve inward toward the central space. In particular, the base of each flow tab 104 may be linear, while the tip may curve inwards. The plurality of flow tabs 104 may be spaced apart from each other by a space that corresponds to a shape of an inverted flow tab, although it should be understood that the spacing may be varied. Furthermore, the plurality of flow tabs 104 may be integrally formed as part of the peripheral band 102. Alternatively, the plurality of flow tabs 104 may be individually secured (e.g., welded) to the perimeter band 102.

The plurality of finger structures 106 extend from a lower portion of the peripheral band 102. In a non-limiting embodiment, each of the plurality of finger structures 106 extends upward and back toward the peripheral band 102. Although the distal ends of the finger structures 106 are illustrated as contacting the peripheral band 102, the present invention is not limited thereto. Each of the plurality of finger structures 106 may have a segment that is parallel to but on a different plane than an outer wall of the peripheral band 102. Furthermore, the plurality of finger structures 106 may be separated from each other by a plurality of slits. It is beneficial for the plurality of slits to be as small as possible to minimize the bypass flow through it when the flow tripping device 100 is put to use in a fuel bundle during the operation of a boiling water reactor (BWR). For instance, the width of each slit may be no more than the thickness of the sheet material used to form the finger structures 106.

Providing the flow tripping device 100 with a plurality of finger structures 106 is advantageous, because it ensures that the flow tripping device 100 will remain in continuous contact with the inner walls of the fuel channel throughout the life of the fuel bundle. For instance, the walls of the fuel channel are subjected to pressure from the internal flow which may cause the fuel channel to bulge/distort over time. Additionally, the fuel channel may experience irradiation growth which will contribute to the bulge/distortion. As a result, having a plurality of individual finger structures 106 configured to apply a spring force to the fuel channel allows the flow tripping device 100 to accommodate to any in-service changes that the fuel channel may undergo during the life of the fuel bundle.

The number of finger structures 106 may vary from that shown in the drawings. Having a greater number of finger structures 106 will increase the ability of the flow tripping device 100 to adjust to any in-service changes/distortions that the fuel channel may undergo. However, a greater number of finger structures 106 will mean a greater number of slits which will consequently increase the bypass flow. Conversely, having a smaller number of finger structures 106 (and, thus, less slits) will decrease the bypass flow but will also decrease the ability of the flow tripping device 100 to adjust to the in-service changes/distortions to the fuel channel. That being said, it may be beneficial for the number of finger structures 106 to be within the range of ±10-15% of that shown in the drawings. For instance, each side of the peripheral band 102 of the flow tripping device 100 may be provided with about twenty-two to thirty finger structures 106.

The flow tripping device 100 also includes a plurality of convex portions 110 on the peripheral band 102. The plurality of convex portions 110 may be elliptical in shape and vertically oriented, although the present invention is not limited thereto. The plurality of convex portions 110 also protrude away from the central space bounded by the peripheral band 102. The extent of the protrusion of the convex portions 110 is less than that of the finger structures 106 based on a side view of the flow tripping device 100. The plurality of convex portions 110 are located in a middle region between the flow tabs 104 at the upper portion of the peripheral band 102 and the finger structures 106 at the lower portion of the peripheral band 102.

Figure 1C:
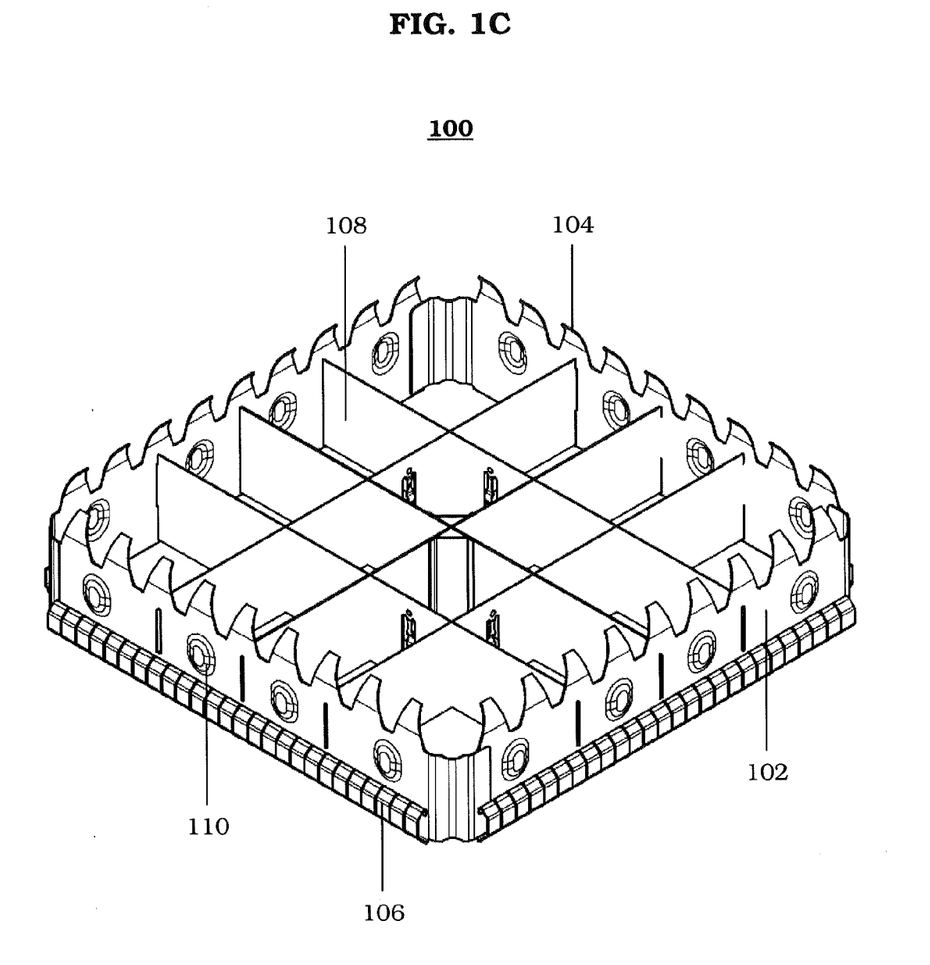
FIG. 1C is a perspective view of a flow tripping device according to a non-limiting embodiment of the present invention.

FIG. 1C is a perspective view of a flow tripping device according to a non-limiting embodiment of the present invention. Referring to FIG. 1C, the height of the dividers 108 may be comparable to that of the peripheral band 102 while not exceeding the height of the flow tabs 104. Although not explicitly labeled, the two central diagonal compartments formed by the dividers 108 may be provided with springs (two each for a total of four springs) to accommodate a water rod in each of the two central diagonal compartments when the flow tripping device 100 is mounted within a fuel channel. Each of the water rods (which may be more or less than the two mentioned above) may have a diameter that is about twice that of each fuel rod. That being said, while the two central diagonal compartments formed by the dividers 108 may each accommodate a water rod, each of the other compartments may accommodate a plurality of fuel rods. Also, as shown in the drawings, four convex portions 110 are provided on each side of the peripheral band 102 (for a total of sixteen convex portions 110). However, it should be understood that the quantity and spacing of the convex portions 110 may be varied.

The flow tripping device according to non-limiting embodiments of the present invention is intended to be incorporated within a fuel bundle. Such a fuel bundle may include a fuel channel, a plurality of fuel rods within the fuel channel, at least one water rod arranged in parallel with the plurality of fuel rods, and a flow tripping device secured to the at least one water rod. An upper tie plate and a lower tie plate may be disposed at opposing ends of the fuel bundle. A plurality of spacers may be placed at predetermined intervals in the fuel bundle to space the fuel rods in an array. A flow tripping device may be arranged between adjacent spacers in the upper region of the fuel bundle. Unlike the spacers, the flow tripping device is designed to not interface with the fuel rods. Stated more clearly, the flow tripping device is configured so as to not contact the fuel rods when installed. The flow tripping device may include a peripheral band surrounding the plurality of fuel rods, a plurality of flow tabs extending from an upper portion of the peripheral band toward the plurality of fuel rods, and a plurality of finger structures extending from a lower portion of the peripheral band and configured to apply a spring force to inner walls of the fuel channel.

Figure 1D:
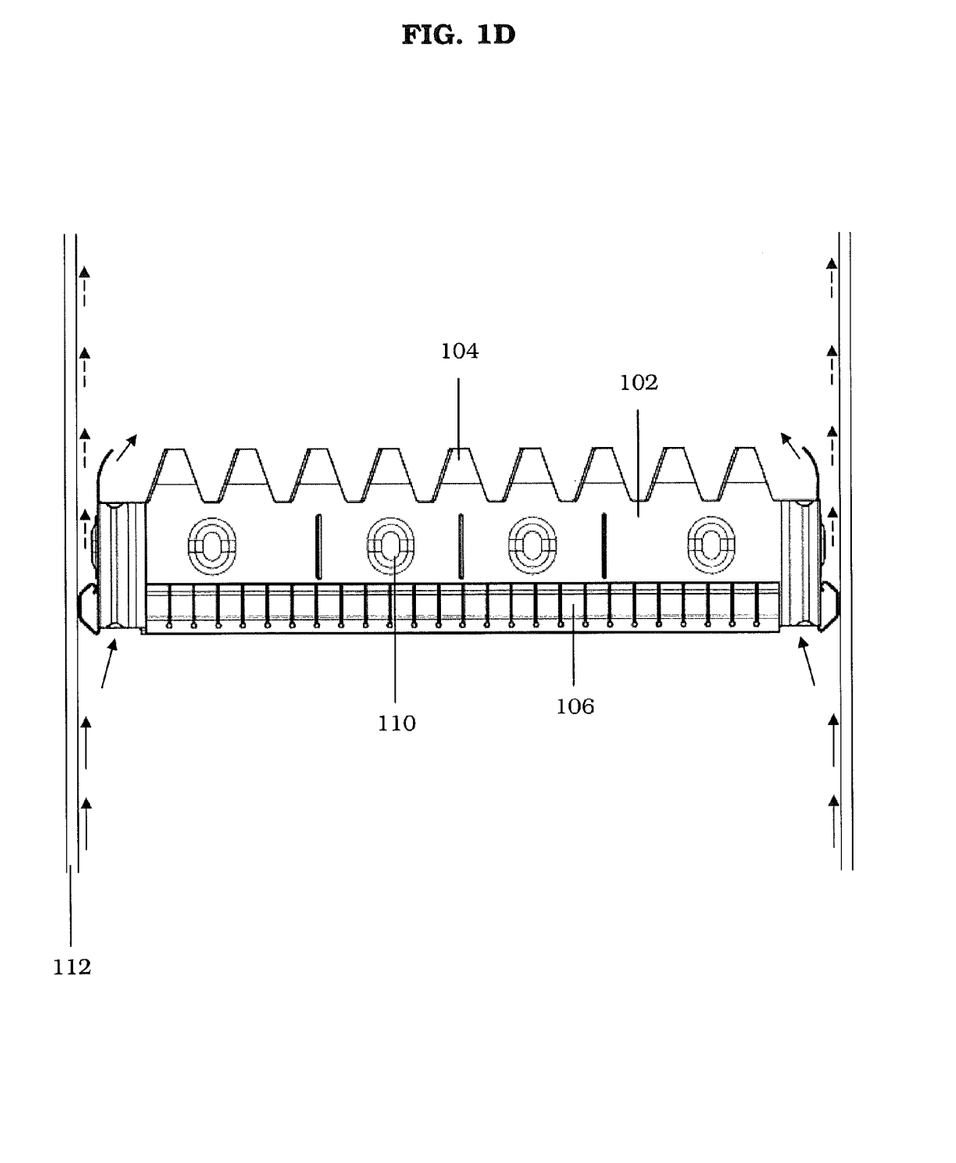
FIG. 1D is a side view illustrating a flow tripping device with the main film flow, bypass flow, and diverted flow according to a non-limiting embodiment of the present invention.

FIG. 1D is a side view illustrating a flow tripping device with the main film flow, bypass flow, and diverted flow according to a non-limiting embodiment of the present invention. Referring to FIG. 1D, the flow tripping device is designed to be attached to one or more water rods (not shown) in a fuel channel and positioned between spacers at the higher elevations of the fuel bundle. Additionally, the structure of the flow tripping device is designed to be at a minimum so as to minimize the pressure drop within the fuel channel.

During the operation of a boiling water reactor (BWR), a water film flows upward on the inner walls of the fuel channel 112. When the water film reaches the flow tripping device 100, a small portion of the water film will pass through the slits between the finger structures 106 as a bypass flow (broken arrows), while a majority of the water film will be diverted into the flow tripping device 100 and redirected by the flow tabs 104 toward the periphery fuel rods (not shown). As a result, the critical power ratio (CPR) performance of the periphery rods may be increased, thereby also increasing overall performance. Consequently, the increased power translates to lower fuel cycle costs.

In view of the above, it should be understood that a method of increasing critical power ratio (CPR) performance may involve installing a flow tripping device according to the present invention in a fuel, channel of a boiling water reactor (BWR). One or more of the flow tripping devices may be installed in the upper region of the fuel bundle. For instance, a flow tripping device may be installed between the first (uppermost) spacer and second spacer. Another flow tripping device may be installed between the second spacer and third spacer. Furthermore, yet another flow tripping device may be installed between the third spacer and fourth spacer.

Figure 2A:
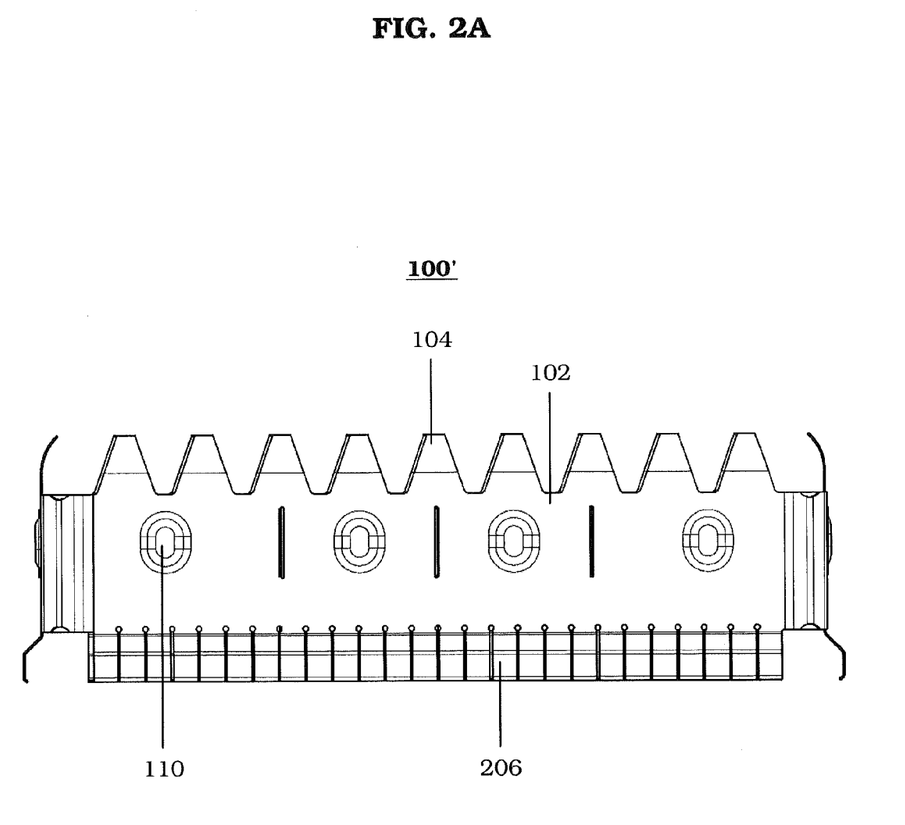
FIG. 2A is a side view of a flow tripping device according to another non-limiting embodiment of the present invention.
Figure 2B:
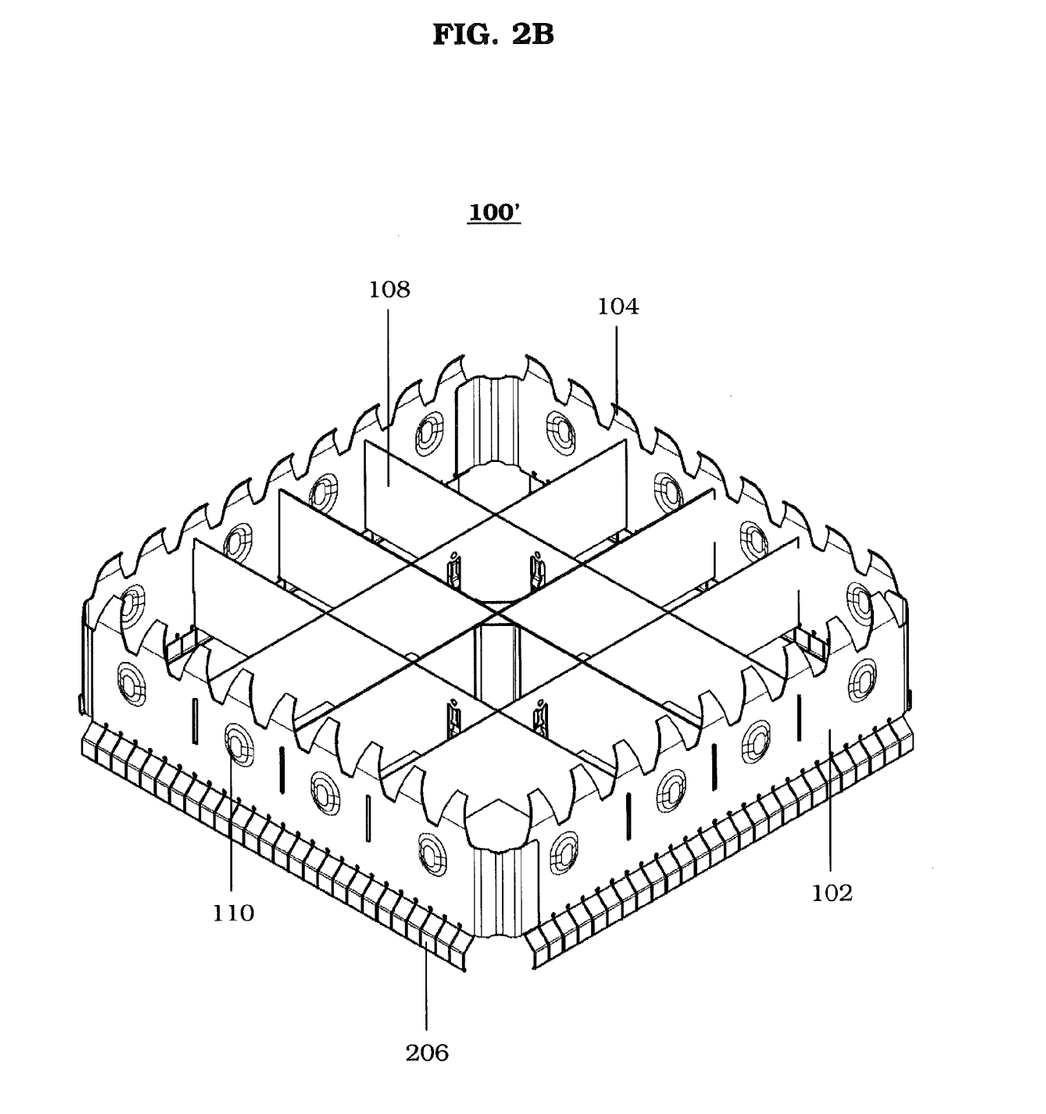
FIG. 2B is a perspective view of a flow tripping device according to another non-limiting embodiment of the present invention.
Figure 2C:
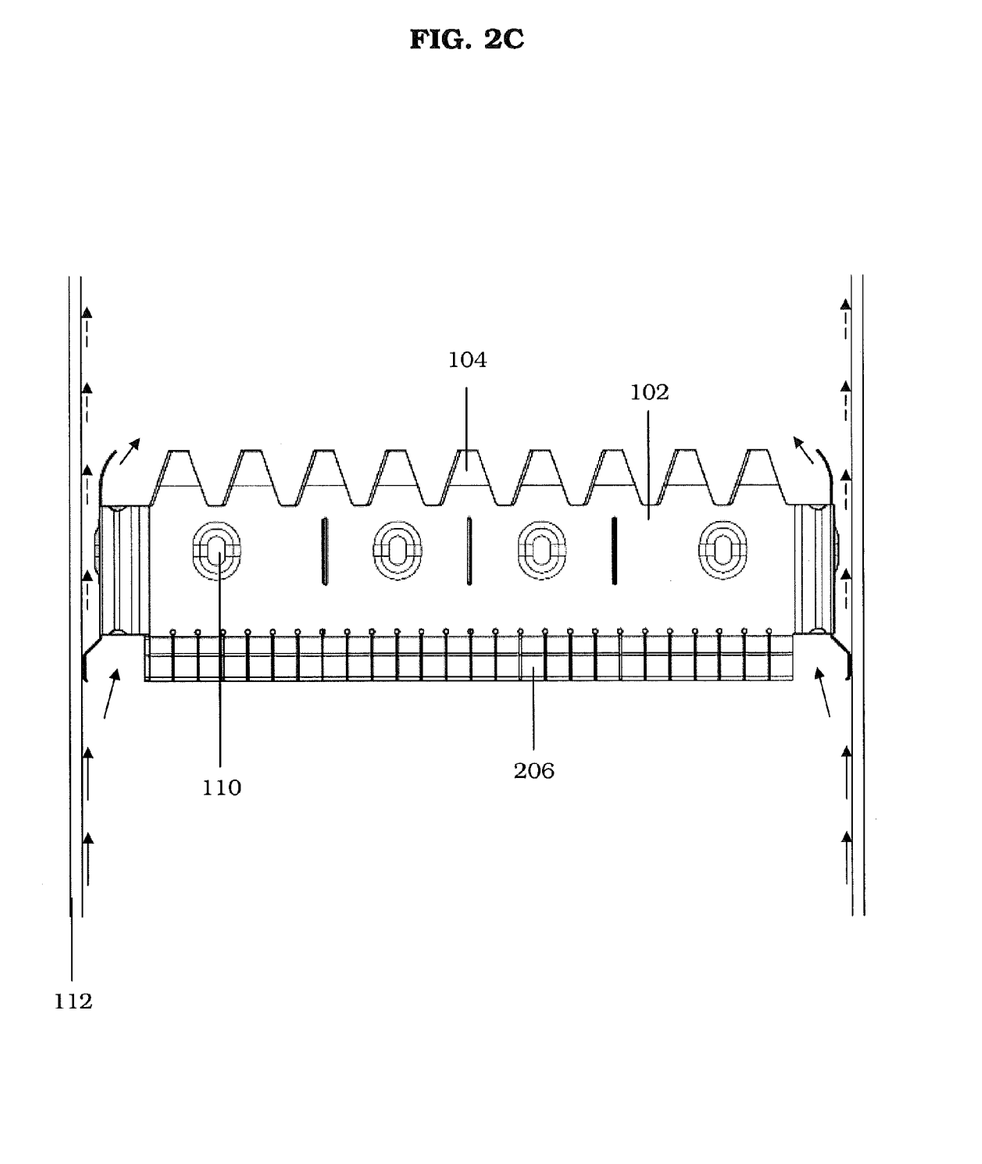
FIG. 2C is a side view illustrating a flow tripping device with the main film flow, bypass flow, and diverted flow according to another non-limiting embodiment of the present invention.

FIG. 2A is a side view of a flow tripping device according to another non-limiting embodiment of the present invention. FIG. 2B is a perspective view of a flow tripping device according to another non-limiting embodiment of the present invention. FIG. 2C is a side view illustrating a flow tripping device with the main film flow, bypass flow, and diverted flow according to another non-limiting embodiment of the present invention. The flow tripping device 100' of FIGS. 2A-2C may be as described above in connection with the flow tripping device 100 of FIGS. 1A-1D with the exception of the finger structures. Accordingly, common features already discussed above will not be repeated below for purposes of brevity.

Referring to FIGS. 2A-2C, each of the plurality of finger structures 206 extends downward and away from the peripheral band 102. For instance, each of the plurality of finger structures 206 may initially extend downward at an angle away from the lower portion of the peripheral band 102 before extending downward vertically so as to be parallel to an outer wall of the peripheral band 102. Although not shown, each corner of the peripheral band 102 may be provided with at least one of the plurality of finger structures 206. Similarly, although not shown, each corner of the peripheral band 102 may be provided with at least one of the plurality of flow tabs 104.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A flow tripping device, comprising:
    a peripheral band surrounding a central space;
    a plurality of flow tabs extending from an upper portion of the peripheral band toward the central space; and
    a plurality of finger structures extending from a lower portion of the peripheral band,
    wherein each side of the peripheral band includes about twenty-two to thirty finger structures.

2. The flow tripping device of claim 1, wherein the peripheral band has a symmetrical shape based on a plan view.

3. The flow tripping device of claim 1, wherein the peripheral band includes a plurality of corners based on a plan view, and each corner of the peripheral band is provided with at least one of the plurality of flow tabs.

4. The flow tripping device of claim 1, wherein the peripheral band includes a plurality of corners based on a plan view, and each corner of the peripheral band is provided with at least one of the plurality of finger structures.

5. The flow tripping device of claim 1, wherein each of the plurality of flow tabs tapers as it extends from the peripheral band.

6. The flow tripping device of claim 1, wherein each of the plurality of flow tabs curves inward toward the central space.

7. The flow tripping device of claim 1, wherein the plurality of flow tabs are spaced apart from each other by a space that corresponds to a shape of an inverted flow tab.

8. The flow tripping device of claim 1, wherein each of the plurality of finger structures has a segment that is parallel to but on a different plane than an outer wall of the peripheral band.

9. The flow tripping device of claim 1, wherein each of the plurality of finger structures extends upward and back toward the peripheral band.

10. The flow tripping device of claim 1, wherein each of the plurality of finger structures extends downward and away from the peripheral band.

11. The flow tripping device of claim 1, wherein the plurality of finger structures are separated from each other by a plurality of slits.

12. The flow tripping device of claim 1, wherein a ratio of the total quantity of the plurality of finger structures to the total quantity of the plurality of flow tabs is about 3:1.

13. The flow tripping device of claim 1, further comprising:
    a plurality of dividers in the central space bounded by the peripheral band.

14. The flow tripping device of claim 13, wherein the plurality of dividers are connected to opposing inner walls of the peripheral band.

15. The flow tripping device of claim 13, wherein a ratio of a total quantity of the plurality of dividers to a total quantity of the plurality of flow tabs is about 1:6.

16. The flow tripping device of claim 13, wherein the plurality of dividers includes a first group of parallel dividers intersecting a second group of parallel dividers.

17. The flow tripping device of claim 16, wherein the first group of parallel dividers is orthogonal to the second group of parallel dividers.

18. The flow tripping device of claim 1, further comprising:
    a plurality of convex portions on the peripheral band.

19. The flow tripping device of claim 18, wherein the plurality of convex portions protrude away from the central space.

20. A fuel bundle comprising:
    a fuel channel;
    a plurality of fuel rods within the fuel channel;
    at least one water rod arranged in parallel with the plurality of fuel rods; and
    a flow tripping device secured to the at least one water rod, the flow tripping device including a peripheral band surrounding the plurality of fuel rods, a plurality of flow tabs extending from an upper portion of the peripheral band toward the plurality of fuel rods, and a plurality of finger structures extending from a lower portion of the peripheral band and configured to apply a spring force to inner walls of the fuel channel,
    wherein each side of the peripheral band includes about twenty-two to thirty finger structures.

* * * * *